O. KUEPFER.
AXLE CONSTRUCTION.
APPLICATION FILED JULY 5, 1913.
1,090,311.
Patented Mar. 17, 1914.
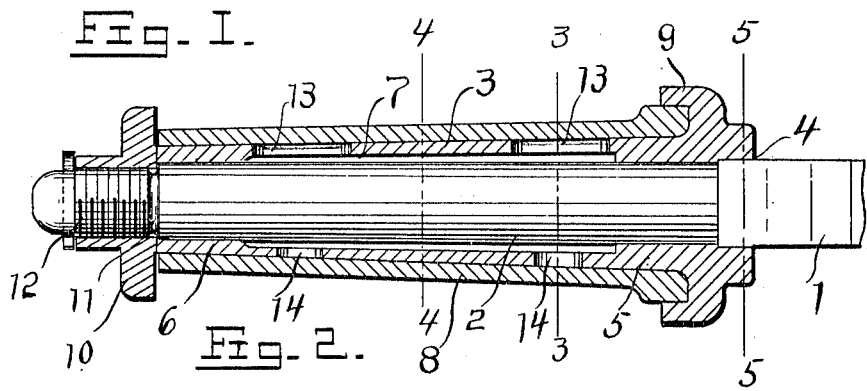
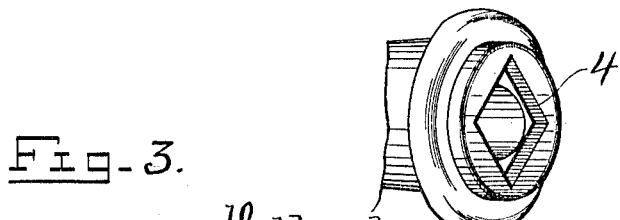
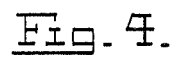
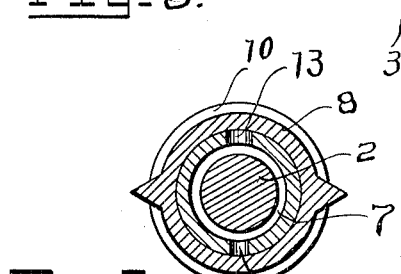
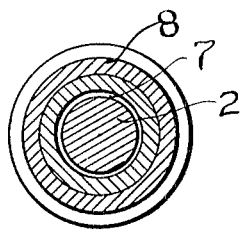
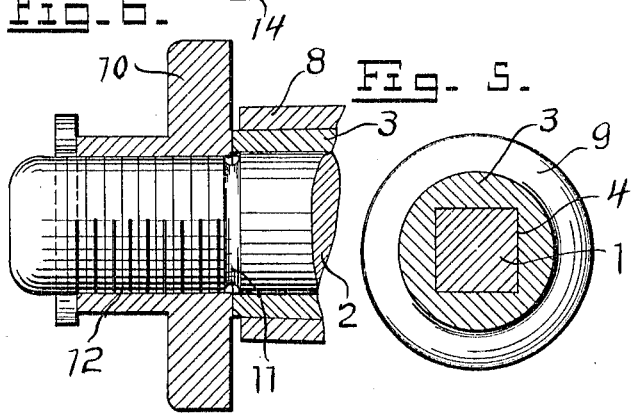
Witnesses
E. S. Hall
Sylvia Boron
Inventor
Otto Kuepfer
By Bond & Miller
Attorney

UNITED STATES PATENT OFFICE.

OTTO KUEPFER, OF CANTON, OHIO, ASSIGNOR TO CLEVELAND AXLE MANUFACTURING COMPANY, OF CANTON, OHIO, A CORPORATION OF OHIO.

AXLE CONSTRUCTION.

1,090,311. Specification of Letters Patent. Patented Mar. 17, 1914.

Application filed July 5, 1913. Serial No. 777,424.

*To all whom it may concern:*

Be it known that I, OTTO KUEPFER, a citizen of the United States, residing at Canton, in the county of Stark and State of Ohio, have invented a new and useful Axle Construction, of which the following is a specification.

My invention relates to improvements in axle construction, in which the axle and spindle portion are formed integral and of steel or equivalent metal.

The objects of the present invention are, first, to provide an all steel axle and so construct it that the skein can be connected to the axle in such a manner that it will be securely and firmly held in fixed position with reference to the axle and spindle portion thereof, second, to so construct the skein that the hub holding nut can be seated snugly against the end of the skein without coming into binding or close contact with the end of the hub boxing, third, to provide means for lubricating the axle.

These objects, together with other objects readily apparent to those skilled in the art, I attain by the construction illustrated in the accompanying drawings, although my invention may be embodied in a variety of other mechanical forms, the construction illustrated being chosen by way of example.

In the accompanying drawing—Figure 1 is a longitudinal section of the skein and boxing, showing the hub holding nut in section. Fig. 2 is a view showing a portion of the skein, said portion being that part provided with the holding socket and boxing flange. Fig. 3 is a transverse section on line 3—3, Fig. 1. Fig. 4 is a transverse section on line 4—4, Fig. 1. Fig. 5 is a section on line 5—5, Fig. 1. Fig. 6 is an enlarged view showing portions of the spindle, skein and boxing together with the hub holding nut, said parts being shown enlarged as compared with Fig. 1.

Similar numerals of reference indicate corresponding parts in all the figures of the drawing.

In the accompanying drawing, 1 represents the body portion of the axle which is preferably rectangular in cross section, and within itself is of the usual construction, and is provided with the integral spindles 2, only one of which is illustrated. The skein 3 is provided with the rectangular socket 4, which rectangular socket is for the purpose of receiving a short portion of the rectangular axle 1 as best illustrated in Fig. 1. The skein 3 is provided with the spindle bearings 5 and 6, said spindle bearings being located at the opposite ends of the skein, thereby leaving a chamber 7 intermediate the inner ends of the spindle bearings 5 and 6, said chamber being located between the inner surface of the skein and the outer surface of the spindle. In order that the skein may be securely connected to the axle I prefer to connect the same by shrinking the skein 3 upon the axle, thereby preventing any relative movement as between the axle and the skein. It will be understood that the bearings 5 and 6 are to be snugly seated against the spindle 2. The hub boxing 8 is of the usual construction so far as its general mechanical make-up is concerned, and is connected to the hub of the wheel in the usual manner.

For the purpose of assisting in holding the boxing 8, the skein 3 is provided with the flange 9, which flange overlaps a portion of the hub boxing 8 when the wheel hub is properly placed upon the skein. It will be understood that the boxing should extend a short distance beyond the inner end of the hub so that it can be entered in the groove formed by the flange 9. In order that the nut 10 may bear directly against the outer end of the skein 3 when placed in proper position to hold the hub the skein is formed of such a length that it will extend a short distance beyond the end of the hub boxing 8, thereby causing the nut 10 to come in direct contact with the outer end of the skein and thus assisting in preventing any end movement of the skein upon the spindle 2. In order to insure the proper seating of the nut 10 against the outer end of the skein 3 I provide the groove 11, which groove is located between the outer end of the spindle and the last convolution of the screw threads upon the screw threaded portion of the spindle, by which arrangement the inner face of the nut will at all times and under all circumstances be brought snugly against the outer end of the skein 3, but at the same time leaving the extreme outer end of the boxing 8 free from the inner face of the nut 10.

For the purpose of providing better lubrication the skein is provided with the elongated slots 13, which are located upon the top or upper side of the skein 3 and are for the purpose of inserting axle grease which finds its way into the chamber 7 and from the underside of the skein 3, through the apertures 14. The axle grease is applied in the ordinary manner, but by providing the apertures 13 and 14, if in the event the skein or spindle becomes heated, the heat will cause the grease to flow more readily, thereby preventing overheating and resultant disadvantages common to the heating of vehicle axles and skeins.

Having fully described my invention what I claim as new and desire to secure by Letters Patent, is—

An axle consisting of a main body portion, a spindle and screw threaded portion, the body portion formed angular in cross section, a skein provided with an angular socket adapted to receive a portion of the axle body adjacent the spindle, said skein formed of a length corresponding substantially with the length of the spindle and provided with spindle bearings at its opposite ends and elongated slots located upon the top or upper side of the skein and apertures upon the under side of the skein, and the inner surface of the skein spaced from the axle intermediate the spindle bearings and a nut located upon the screw threaded portion of the spindle and adapted to abut against the outer end of the skein, and a groove located between the outer end portion of the spindle and the screw threads of the screw threaded portion of the spindle.

In testimony that I claim the above, I have hereunto subscribed my name in the presence of two witnesses.

OTTO KUEPFER.

Witnesses:
WILLIAM H. MILLER,
JOHN T. BLAKE.

Copies of this patent may be obtained for five cents each, by addressing the "Commissioner of Patents, Washington, D. C."